United States Patent Office 3,000,879
Patented Sept. 19, 1961

3,000,879
PROCESS FOR THE PRODUCTION OF EPSILON-CAPROLACTAMS
Benjamin Phillips, Charleston, Samuel W. Tinsley, South Charleston, and Paul S. Starcher, Charleston, W. Va., assignors to Union Carbide Corporation, a corporation of New York
No Drawing. Filed June 8, 1959, Ser. No. 818,540
6 Claims. (Cl. 260—239.3)

This invention relates to the preparation of lactams and more particularly to the preparation of epsilon-caprolactams. More particularly, this invention is directed to a non-catalytic process for the production of epsilon-caprolactams by the heating of the corresponding 6-hydroxycaproamides in the presence of water at high temperatures and superatmospheric pressures. This invention is further directed to a non-catalytic process for the production of epsilon-caprolactams whereby the reaction reaches an equlibrium so that approximately 50 percent of the 6-hydroxycaproamides form monomeric epsilon-caprolactams while the other 50 percent remains capable of subsequent conversion to additional epsilon-caprolactams. Recycling of the reactants under the conditions identical to those of the initial reactions produces additional monomeric epsilon-caprolactams. Continuing the recycling process, yield efficiencies from about 85 to 95 percent of 6-hydroxycaproamides to the corresponding epsilon-caprolactams are obtained.

It is an object of this invention to provide a one-step process for the production of epsilon-caprolactams. A further object of this invention is to provide a process for the production of epsilon-caprolactams to the substantial exclusion of polymerized material and in high yield efficiencies of 6-hydroxycaproamides to epsilon-caprolactams. Another object of this invention is to provide a one-step process for the production of alkyl-substituted epsilon-caprolactams and N-alkyl-epsilon-caprolactams. These and other objects will become readily apparent to those skilled in the art in light of the teachings herein set forth.

Lactams are used for the production of polyamides suitable for the manufacture of fabrics, films, fibers, coating compositions and the like. Heretofore, the usual preparation of lactams has been by Beckmann rearrangement of ketoximes. Caprolactam, the most important member of this class, has long been prepared by rearrangement of cyclohexanone oxime. For example, the preparation of the oxime by treating nitrocyclohexane or its salt with hydroxylamine, hydrogen, sulfur, sodium nitrite and the like is well known in the art. It is also known to prepare cyclohexanone oxime by treatment of cyclohexanone-bisulfite complexes with nitrous acid and the like processes. More recent prior art discloses methods whereby caprolactams are prepared by reacting an ester of epsilon-hydroxycaproic acid alone or with a mixture of an ammonium salt of epsilon-hydroxycaproic acid in the presence of an excess of concentrated aqueous ammonia solution under conditions of superatmospheric pressures and temperature ranges from about 250° C. to about 300° C.

The present invention is based on the discovery that epsilon-caprolactams can be produced by heating a reaction mixture consisting of a 6-hydroxycaproamide and water, under superatmospheric pressures and at temperatures in the range from about 300° C to about 475° C.

The process of this invention is readily accomplished by heating a reaction mixture consisting of a 6-hydroxycaproamide and water in the temperature range of about 300° C. to about 475° C. preferably in the range of about 350° C. to about 425° C. under superatmospheric pressures. The reaction mixture, upon cooling, is subjected to conventional recovery procedures such as extraction with chloroform followed by distillation to recover the corresponding epsilon-caprolactams.

The presence of water is required in this invention to prevent the polymerization of the hydroxycaproamides at high temperatures; however, the amount of water present is not necessarily critical.

The process may be carried out continuously, the residence time in the reaction zone being such that, in view of the high reaction temperature and superatmospheric pressure, maximum conversions will be obtained.

The 6-hydroxycaproamides suitable for use as starting materials in carrying out the process of this invention correspond to the general formula:

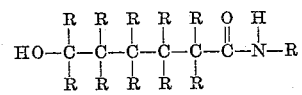

wherein R represents members selected from the group consisting of hydrogen atoms and alkyl groups.

A preferred class of 6-hydroxycaproamides suitable for use as starting materials are those hydroxycaproamides corresponding to the general formula set forth above wherein R represents hydrogen atoms and alkyl groups and wherein the total number of carbon atoms contained in said alkyl groups does not exceed twelve. The preferred starting materials and resulting products of this process are listed as follows:

| Starting Materials | Resulting Products |
|---|---|
| 6-hydroxycaproamide | epsilon,caprolactam. |
| 2-methyl-6-hydroxycaproamide | alpha-methyl-epsilon-caprolactam. |
| 3-methyl-6-hydroxycaproamide | beta-methyl-epsilon-caprolactam. |
| 4-methyl-6-hydroxycaproamide | gamma-methyl-epsilon-caprolactam. |
| 5-methyl-6-hydroxycaproamide | delta-methyl-epsilon,caprolactam. |
| 6-methyl-6-hydroxycaproamide | epsilon-methyl-epsilon-caprolactam. |
| 2-ethyl-6-hydroxycaproamide | alpha-ethyl-epsilon-caprolactam. |
| 3-ethyl-6-hydroxycaproamide | beta-ethyl-epsilon-caprolactam. |
| 4-ethyl-6-hydroxycaproamide | gamma-ethyl-epsilon-caprolactam. |
| 5-ethyl-6-hydroxycaproamide | delta-ethyl-epsilon-caprolactam. |
| 6-ethyl-6-hydroxycaproamide | epsilon-ethyl-epsilon-caprolactam. |
| 2,3-dimethyl-6-hydroxycaproamide | alpha,beta-dimethyl-epsilon-caprolactam. |
| 2,4-dimethyl-6-hydroxycaproamide | alpha,gamma-dimethyl-epsilon-caprolactam. |
| 2,5-dimethyl-6-hydroxycaproamide | alpha, delta-dimethyl-epsilon-caprolactam. |
| 2,6-dimethyl-6-hydroxycaproamide | alpha,epsilon-dimethyl-epsilon-caprolactam. |
| 3,4-dimethyl-6-hydroxycaproamide | beta,gamma-dimethyl-epsilon-caprolactam. |
| 3,5-dimethyl-6-hydroxycaproamide | beta,delta-dimethyl-epsilon-caprolactam. |
| 3,6-dimethyl-6-hydroxycaproamide | beta,epsilon-dimethyl-epsilon-caprolactam. |
| 4,5-dimethyl-6-hydroxycaproamide | gamma,delta-dimethyl-epsilon-caprolactam. |
| 4,6-dimethyl-6-hydroxycaproamide | gamma,epsilon-dimethyl-epsilon-caprolactam. |
| 5,6-dimethyl-6-hydroxycaproamide | delta,epsilon-dimethyl-epsilon-caprolactam. |
| 3,3,5-trimethyl-6-hydroxycaproamide. | beta,beta,delta-trimethyl-epsilon-caprolactam. |
| 3,5,5-trimethyl-6-hydroxycaproamide. | beta,delta,delta-trimethyl-epsilon-caprolactam. |
| 2,3,4-trimethyl-6-hydroxycaproamide. | alpha,beta,gamma-trimethyl-epsilon-caprolactam. |
| 2,3,6-trimethyl-6-hydroxycaproamide. | alpha,beta,epsilon-trimethyl-epsilon-caprolactam. |
| 2,4,5-trimethyl-6-hydroxycaproamide. | alpha,gamma,delta-trimethyl-epsilon-caprolactam. |
| 2,4,6-trimethyl-6-hydroxycaproamide. | alpha,gamma,epsilon-trimethyl-epsilon-caprolactam. |
| 4,5,6-trimethyl-6-hydroxycaproamide. | gamma,delta,epsilon-trimethyl-epsilon-caprolactam. |
| 2-ethyl,3-methyl-6-hydroxycaproamide. | alpha-ethyl-beta-methyl-epsilon-caprolactam. |
| 2-ethyl,4-methyl-6-hydroxycaproamide. | alpha-ethyl-gamma-methyl-epsilon-caprolactam. |
| 2-ethyl,5-methyl-6-hydroxycaproamide. | alpha-ethyl-delta-methyl-epsilon-caprolactam. |
| 2-ethyl,6-methyl-6-hydroxycaproamide. | alpha-ethyl-epsilon-methyl-epsilon-caprolactam. |
| 3-ethyl,2-methyl-6-hydroxycaproamide. | beta-ethyl-alpha-methyl-epsilon-caprolactam. |
| 3-ethyl,4-methyl-6-hydroxycaproamide. | beta-ethyl-gamma-methyl-epsilon-caprolactam. |
| 3-ethyl,5-methyl-6-hydroxycaproamide. | beta-ethyl-delta-methyl-epsilon-caprolactam. |
| 3-ethyl,6-methyl-6-hydroxycaproamide. | beta-ethyl-epsilon-methyl-epsilon-caprolactam. |

| Starting Materials | Resulting Products |
| --- | --- |
| 4-ethyl,2-methyl-6-hydroxycaproamide. | gamma-ethyl-alpha-methyl-epsilon-caprolactam. |
| 4-ethyl,3-methyl-6-hydroxycaproamide. | gamma-ethyl-beta-methyl-epsilon-caprolactam. |
| 4-ethyl,5-methyl-6-hydroxycaproamide. | gamma-ethyl-delta-methyl-epsilon-caprolactam. |
| 4-ethyl,6-methyl-6-hydroxycaproamide. | gamma-ethyl-epsilon-methyl-epsilon-caprolactam. |
| 6-ethyl,2-methyl-6-hydroxycaproamide. | epsilon-ethyl-alpha-methyl-epsilon-caprolactam. |
| 6-ethyl,3-methyl-6-hydroxycaproamide. | epsilon-ethyl-beta-methyl-epsilon-caprolactam. |
| 6-ethyl,4-methyl-6-hydroxycaproamide. | epsilon-ethyl-gamma-methyl-epsilon-caprolactam. |
| 6-ethyl,5-methyl-6-hydroxycaproamide. | epsilon-ethyl-delta-methyl-epsilon caprolactam. |
| 2,2-dimethyl-6-hydroxycaproamide. | alpha,alpha-dimethyl-epsilon-caprolactam. |
| 3,3-dimethyl-6-hydroxycaproamide. | beta,beta-dimethyl-epsilon-caprolactam. |
| 4,4-dimethyl-6-hydroxycaproamide. | gamma,gamma-dimethyl-epsilon-caprolactam. |
| 2,2,3-trimethyl-6-hydroxycaproamide. | alpha,alpha,beta-trimethyl-epsilon-caprolactam. |
| 3,3,4-trimethyl-6-hydroxycaproamide. | beta,beta,gamma-trimethyl-epsilon-caprolactam. |
| 4,4,6-trimethyl-6-hydroxycaproamide. | gamma,gamma,epsilon-trimethyl-epsilon-caprolactam. |
| 5,5,2-trimethyl-6-hydroxycaproamide. | delta,delta,alpha-trimethyl-epsilon-caprolactam. |
| 3,3-dimethyl-4-ethyl-6-hydroxycaproamide. | beta,beta-dimethyl-gamma-ethyl-epsilon-caprolactam. |
| 4,4-dimethyl-2-ethyl-6-hydroxycaproamide. | gamma,gamma-dimethyl-alpha-ethyl-epsilon-caprolactam. |
| N-methyl-6-hydroxycaproamide. | N-methyl-epsilon-caprolactam. |
| N-ethyl-6-hydroxycaproamide. | N-ethyl-epsilon-caprolactam. |
| N-propyl-6-hydroxycaproamide. | N-propyl-epsilon-caprolactam. |
| N-butyl-6-hydroxycaproamide. | N-butyl-epsilon-caprolactam. |
| N-pentyl-6-hydroxycaproamide. | N-pentyl-epsilon-caprolactam. |
| N-hexyl-6-hydroxycaproamide. | N-hexyl-epsilon-caprolactam. |
| N-methyl-6-hydroxycaproamide. | N-methyl-epsilon-caprolactam. |
| N-hexyl-6-hydroxycaproamide. | N-hexyl-epsilon-caprolactam. |
| N-butyl-2-methyl-6-hydroxycaproamide. | N-butyl-alpha-methyl-epsilon-caprolactam. |
| N-methyl-3-methyl-6-hydroxycaproamide. | N-methyl-beta-methyl-epsilon-caprolactam. |
| N-ethyl-4-methyl-6-hydroxycaproamide. | N-ethyl-gamma-methyl-epsilon-caprolactam. |
| N-propyl-5-methyl-6-hydroxycaproamide. | N-propyl-delta-methyl-epsilon-caprolactam. |
| N-pentyl-6-methyl-6-hydroxycaproamide. | N-pentyl-epsilon-methyl-epsilon-caprolactam. |
| N-methyl-3-ethyl-6-hydroxycaproamide. | N-methyl-beta-ethyl-epsilon-caprolactam. |
| N-butyl-2,3-dimethyl-6-hydroxycaproamide. | N-butyl-alpha,beta-dimethyl-epsilon-caprolactam. |
| N-methyl-2,5-dimethyl-6-hydroxycaproamide. | N-methyl-alpha,delta-dimethyl-epsilon-caprolactam. |
| N-propyl-3,4-dimethyl-6-hydroxycaproamide. | N-propyl-beta,gamma-dimethyl-epsilon-caprolactam. |
| N-butyl-4,5-dimethyl-6-hydroxycaproamide. | N-butyl-gamma,delta-dimethyl-epsilon-caprolactam. |
| N-methyl-3,3,5-trimethyl-6-hydroxycaproamide. | N-methyl-beta,beta,delta-trimethyl-epsilon-caprolactam. |
| N-ethyl-2,4,6-trimethyl-6-hydroxycaproamide. | N-ethyl-alpha,gamma,epsilon-trimethyl-epsilon-caprolactam. |
| N-propyl-4,5,6-trimethyl-6-hydroxycaproamide. | N-propyl-gamma,delta,epsilon-trimethyl-epsilon-caprolactam. |
| N-butyl-2-ethyl-4-methyl-6-hydroxycaproamide. | N-butyl-alpha-ethyl-gamma-methyl-epsilon-caprolactam. |
| N-methyl-3-ethyl-5-methyl-6-hydroxycaproamide. | N-methyl-beta-ethyl-delta-methyl-epsilon-caprolactam. |
| N-propyl-4-ethyl-6-methyl-6-hydroxycaproamide. | N-propyl-gamma-ethyl-epsilon-methyl-epsilon-caprolactam. |
| N-methyl-6-ethyl-4-methyl-6-hydroxycaproamide. | N-methyl-epsilon-ethyl-gamma-methyl-epsilon-caprolactam. |
| N-propyl-4,4-dimethyl-6-hydroxycaproamide. | N-propyl-gamma,gamma-dimethyl-epsilon-caprolactam. |
| N-methyl-4,4-dimethyl-2-ethyl-6-hydroxycaproamide. | N-methyl-gamma,gamma-dimethyl-alpha-ethyl-epsilon-caprolactam. |

The time of reaction is not necessarily critical and may vary from 10 minutes to as much as a day depending on the reaction conditions. Most desirably, conditions are adjusted so as to complete the reaction in about one to three hours.

The term "superatmospheric pressure" as used herein is defined as the pressure produced by the reactants on heating in a closed vessel or higher pressures if desired. This pressure is maintained for the duration of the reaction.

The term "lower alkyl" as used herein is intended to mean saturated, unsubstituted hydrocarbon chains containing from one through eight carbon atoms per chain. Typical "lower alkyl" groups include methyl, ethyl, propyl, isopropyl, butyl, isobutyl, tertiary-butyl, amyl, hexyl, heptyl, octyl and the like.

The following examples served to illustrate the invention.

*Example I*

A solution of 300 grams of 6-hydroxycaproamide (melting point 54° C.) in 900 grams of water (25 percent solution) was heated for three hours in a stainless steel bomb (three-liter) at 350° C. and autogenous pressures. The reaction mixtures from two such duplicate runs were combined and extracted four times with 700-milliliter portions of chloroform. The chloroform extracts were distilled and there was recovered 157 grams epsilon-caprolactam characterized by the following physical properties: boiling point, 112° C. at 2.5 millimeters; melting point, 67° C. The yield was 30.4 percent of the theoretical.

In an analogous manner as the above example N-methyl-epsilon-caprolactam is prepared from N-methyl-6-hydroxycaproamide.

*Example II*

A run made exactly as Example I except that the solution heated was a 10 percent solution of 6-hydroxycaproamide in water gave a 31 percent yield of epsilon-caprolactam (melting point, 67–68° C.).

*Example III*

A solution of 300 grams of 3-methyl-6-hydroxycaproamide in 900 grams of water (25 percent solution) is heated for three hours in a stainless steel bomb (three-liter) at 350° C. and autogenous pressures. The reaction mixtures from two such duplicate runs are combined and extracted four times with 700-milliliter portions of chlorofrom. The chloroform extracts are distilled to yield 184 grams of beta-methyl-epsilon-caprolactam. The yield is 35.0 percent of the theoretical.

*Example IV*

A solution of 300 grams of 3,5-dimethyl-6-hydroxy caproamide in 900 grams of water (25 percent solution) is heated for three hours in a stainless steel bomb (three-liter) at 350° C. and autogenous pressures. The reaction mixtures from two such duplicate runs are combined and extracted four times with 700-milliliter portions of chloroform. The chloroform extracts are distilled to yield 164 grams of beta,delta-dimethyl-epsilon-caprolactam. The yield is 31 percent of the theoretical.

What is claimed is:

1. A process for the production of an epsilon-caprolactam which comprises heating a 6-hydroxycaproamide, characterized by the structural formula:

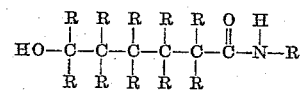

wherein R represents members selected from the group consisting of hydrogen and lower alkyl groups, in water at temperatures ranging from about 300° C. to about 475° C. at superatmospheric pressures.

2. The process of claim 1 in which the temperatures range from about 350° C. to about 425° C.

3. The process of claim 1 wherein the hydroxycaproamide used is 6-hydroxycaproamide to produce epsilon-caprolactam.

4. The process of claim 1 wherein the hydroxycaproamide used is 3-methyl-6-hydroxycaproamide to produce beta-methyl-epsilon-caprolactam.

5. The process of claim 1 wherein the hydroxycaproamide used is 3,5-dimethyl-6-hydroxycaproamide to produce beta,delta-dimethyl-epsilon-caprolactam.

6. The process of claim 1 wherein the hydroxycaproamide used is N-methyl-6-hydroxycaproamide to produce N-methyl-epsilon-caprolactam.

No references cited.